Patented June 22, 1937

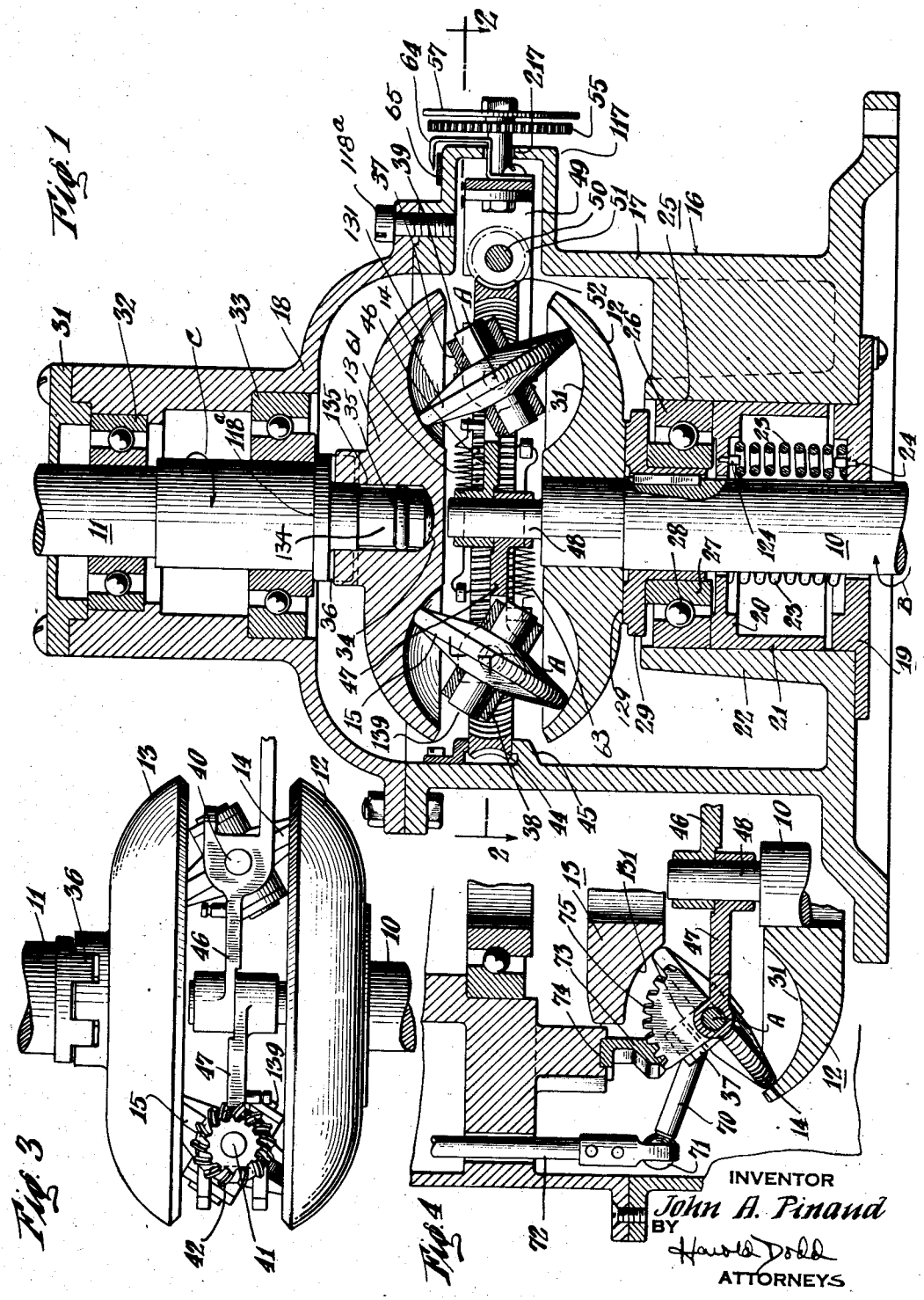
June 22, 1937.　　　　J. A. PINAUD　　　　2,084,703
VARIABLE SPEED TRANSMISSION DEVICE
Filed June 7, 1934　　　2 Sheets-Sheet 1
INVENTOR
John A. Pinaud
BY
Harold Dodd
ATTORNEYS

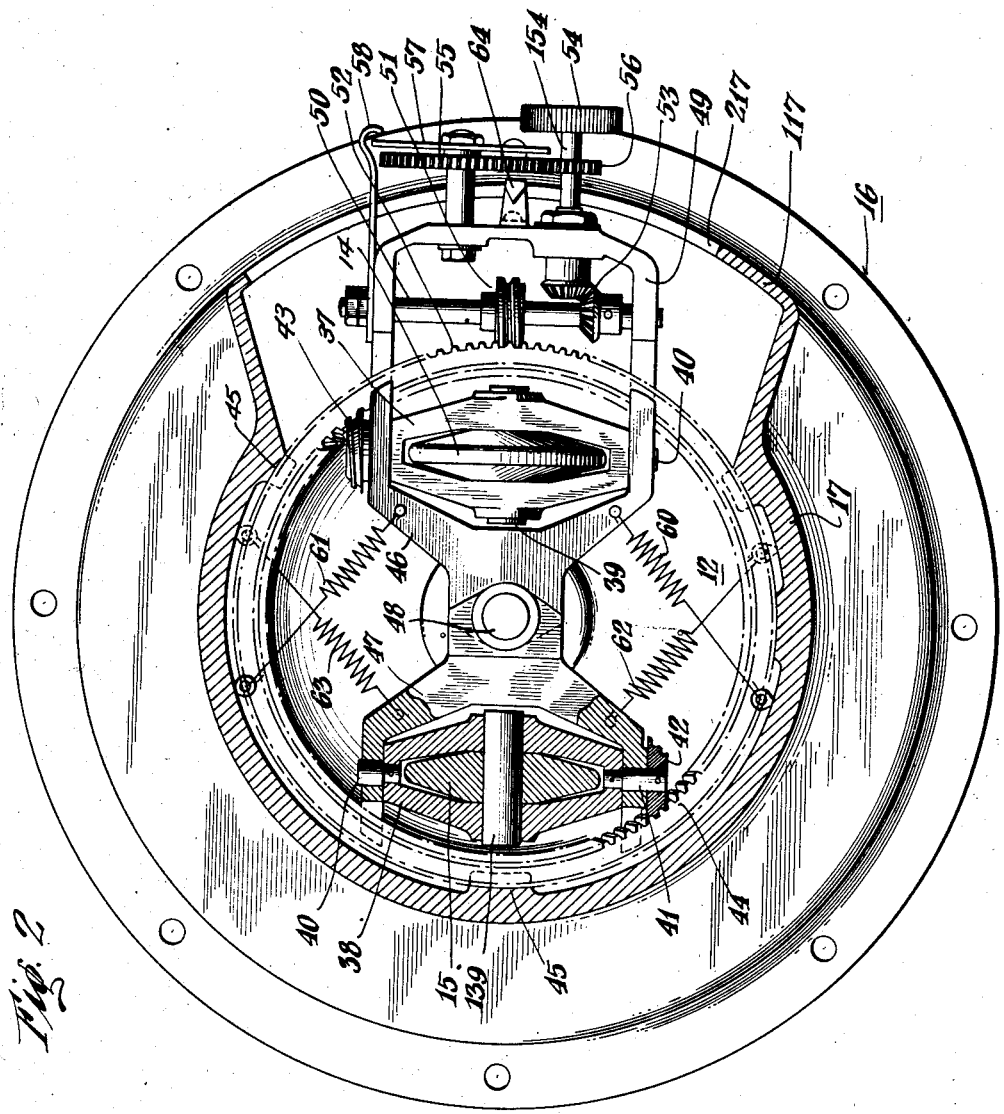

2,084,703

UNITED STATES PATENT OFFICE 2,084,703

VARIABLE SPEED TRANSMISSION DEVICE

John A. Pinaud, Atlantic Highlands, N. J.

Application June 7, 1934, Serial No. 729,482

19 Claims. (Cl. 74—200)

The invention relates to mechanical power transmission.

According to the invention a power transmission device is provided by which the speed ratio between driving and driven shafts may be varied gradually from one value to another in contrast to devices for varying the speed ratio by finite steps.

According to a preferred form of the invention the speed change device may comprise opposed disc races having opposed annular grooves in which are disposed a master roller and one or more follower or auxiliary rollers. Devices may be provided for changing the axis of revolution of the master roller and thereby change the speed ratio between the races. Suitable devices are provided for automatically maintaining the follower rollers in positions which absolutely correspond to the position of the master roller.

The speed change device may be used with a constant speed drive shaft to vary the speed of the driven shaft, or, if desired, it may be used with a variable speed drive shaft and a suitable governor to maintain the speed of the driven shaft constant. If desired, the positions of the rollers between the races may be used to assist in measuring the torque transmitted and thereby adapt the device for use as a dynamometer.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 represents an axial section through the device;

Fig. 2 is a transverse section taken on the line 2—2 of Fig. 1;

Fig. 3 is a fragmentary outside view; and

Fig. 4 is a fragmentary axial section of a modified form of the invention.

Like reference characters denote like parts in the several figures of the drawings.

Referring now to the drawings, the drive shaft is denoted by 10, the driving shaft by 11 and the 'casing enclosing the speed change device by 16. The drive shaft 10 drives the race 12 and the race 13 is secured to the driven shaft 11. The master roller is indicated by 14 and, in the form illustrated, the single follower roller is indicated by 15. It will be understood that the speed ratio of the races 12 and 13 is determined by the inclination of the rollers 14 and 15.

The casing 16 comprises a body part 17 and a cap part 18 suitably secured thereto by flanges and bolts indicated by 118a.

The drive shaft 10 is suitably keyed to a flanged friction clutch member 29 which is seated within the inner race 27 of an axial thrust bearing 25. The outer race is denoted by 26 and a plurality of balls are denoted by 28. The outer race 26 fits snugly within the tubular extension 22 of the body 17 and is disposed against a sleeve member 21.

A thrust plate 19 is suitably bolted to the body 17 and a plurality of helical springs as, for instance, three are disposed between the thrust plate 19 and the flange plate 20 on the sleeve member 21. These springs are denoted by 23 and, if desired, they may be positioned by means of suitable pins 24 and 124 secured to the plates 19 and 20, respectively.

The driving race 12 is journalled upon the drive shaft 10 and has a surface engaging the friction member 29 forming therewith a friction slip clutch, whose clutch surface is indicated by 129.

The upper race 13 is constrained to rotate with the driven shaft 11, but is self alining. The driven shaft is journalled in end thrust bearing 33 and radial bearing 32. The plate 31 holds the radial bearing 32 in position. The end thrust bearing 33 is held between a shoulder on the cap 18 and a shoulder 118a on the driven shaft 11.

To allow the driven race 13 a slight self aligning movement on the driven shaft 11, the driving shaft is provided with a reduced extension 134 having a spherical end 34 fitting a corresponding spherical end in the recess 135 of driven race 13. The reduced end 134 is made slightly smaller than the recess 135 and is provided with an annular flange 35 having a rounded surface, as indicated, which fits snugly against the walls of the recess 135. There is a clearance space between the upper part of reduced extension 134 and the wall of recess 135 juxtaposed thereto adjacent the interlocking clutch teeth 36, which, with the usual clearance space between such teeth 36, afford said slight self aligning movement of driven race 13 relative to its driven shaft 11.

The driven race 13 is provided with a plurality of notches in which projections 36 on the shaft 11 loosely fit, it being understood that these projections 36 do not engage the bottom of the notches.

The driving race 12 is provided with an annular groove 31 and the driven race 13 is provided with an annular groove 131. Fitting between these grooves are the master roller 14 and the follower or auxiliary roller 15. These rollers are identical in construction and are sections or zones of ball bearings which would ordinarily fit between the grooves 31 and 131 to make an ordinary end thrust ball bearing. The rollers 14 and 15 have their peripheral surfaces rounded with a curvature slightly greater than the transverse curvature of the grooves 31 and 131. It will be understood that the transverse curvature of the grooves 31 and 131 is determined by a circle whose center is the point indicated by A, as will hereinafter be explained more in detail.

Holders 37 and 38 are provided for the rollers 14 and 15. The rollers 14 and 15 are provided with pins 39 and 139 by which these rollers are journalled in the holders 37 and 38.

The holders 37 and 38 in turn are swiveled in carriers 46 and 47 pivoted on the reduced end 48 of drive shaft 10. The holders 37 and 38 are provided with pivot members 40 and 41 at opposite ends. These pivot members are movable with the holders 37 and 38. Each pivot member 41 has a spiral toothed gear secured thereto, these gears being indicated by 42 and 43. The gears 42 and 43 engage a large ring gear, indicated by 44, which is suitably journalled between projections 45 on the body 17.

To vary the speed ratio, the inclination of the master roller 14 is changed about the axis A. The follower roller 15 is constrained to take an exact and proper similar inclination by a mechanism explained hereinafter.

For changing the inclination of the master roller 14, a frame, indicated by 49, is secured to the carrier 46. This frame journals the shaft 50 which carries a worm 51 engaging the worm wheel teeth 52 on the outside of ring gear 44 forming an irreversible worm and gear arrangement. The shaft 50 is rotated by a hand wheel 54 journalled upon a shaft 154. A pair of bevel gears 53 connect the shafts 154 and 50.

To indicate the rotation of the hand wheel 54 and thereby the inclination of the master roller 14, a gear 56 is mounted on the shaft 154, driving a spur gear 55 which carries an indicating plate 57. This indicating plate has suitable indications thereon and cooperates with a fixed pointer 58 mounted on the frame 49.

It will be noted that the body 17 is provided with an extended portion, indicated by 117, for housing the adjusting mechanism, and that a suitable slot 217 is provided through which part of this mechanism projects to permit a slight planetary movement of the mechanism, as hereinafter explained.

To yieldably hold the carriers 46 and 47 in position for either direction of rotation of the drive shaft 10, springs 60, 61 and 62, 63 connect the carrier members to the body 17, as indicated.

If desired, a pointer 64 may be connected to the frame 49 cooperating with a scale 65 located on the extension 117 to indicate the position of the carrier 46 with respect to the body 17 to assist in measuring the torque transmitted and permitting the arangement to be used as a dynamometer.

It will be understood that the springs 23 are very powerful and hold the clutch surfaces 129 in close engagement and also hold the rollers 14 and 15 in tight frictional engagement with the races 12 and 13, preventing all slipping between these members for normal power transmission. The clutch surface 129 is arranged, however, so that slippage will occur upon overload thereby preventing all damage to the surfaces of the rollers 14 and 15 and of the race grooves 31 and 131 and other parts of the device. This operates as a safety arrangement.

To use the mechanism as a speed change device to vary the speed ratio between driving and driven shafts, assuming that the drive shaft 10 is rotating at constant speed, the hand wheel 54 is rotated to tip or incline the master roller 14 to the proper degree to obtain the desired speed ratio. Due to the construction of the device the follower roller 15 will automatically take up a corresponding inclination so that the parts of the races contacted by it rotate at lineal speeds corresponding to the parts of the races contacted by the master roller 14. That is to say, that the requisite adjustment of hand wheel 54 causes worm 51 to correspondingly move ring gear 44, whose internal teeth engaging with gears 42 and 43 correspondingly and substantially simultaneously move rollers 14 and 15 to substantially the same positions of opposite angularity.

If some means were not provided to insure an exact relation, damage to the surfaces of the races or of the rollers would surely occur, especially after some wear has taken place.

To illustrate how the automatic operation takes place, assume that the rollers have been adjusted to the position shown and that the drive shaft 10 is rotating, as indicated by the arrow B. This will rotate the driven shaft in the opposite direction, as indicated by the arrow C. If power is to be transmitted between the races, the positions of the rollers 14 and 15 must be substantially stationary. If these rollers were not held stationary, rotation of the drive shaft 10 would merely result in the carriers 46 and 47 executing a planetary movement with no movement to the driven shaft 11 taking place. However, the springs 60, 61 and 62, 63 hold the rollers 14 and 15 in substantially fixed positions.

If we assume that the roller 15 takes a position with less inclination to the axes of shafts 10 and 11 than the roller 14, and if we consider that no slippage takes place between the races and the rollers 14 and 15, the roller 14 will tend to drive race 13 at a higher angular speed than the roller 15. Roller 15 must rotate about its own axis more slowly than roller 14. But, as the radius of the path of roller 15 on race 13 is greater than that of roller 14, the speed of the path of roller 15 on race 13 is greater than the peripheral speed of roller 15 and roller 15 must execute a planetary movement in the same direction as the race 13. This, of course, assumes that the roller 14 maintains a fixed position. Actually both rollers execute planetary movements relatively to each other to correct this condition, but the master roller maintains its set inclination which is determined by the hand wheel 54.

Relative correcting movement of the rollers 14 and 15 causes the inclination of the follower roller 15 to change in such direction as to correct the defective condition so that each roller causes the same speed change. This change of inclination of roller 15 takes place by virtue of movement between gears 42 and 44. No correcting movement takes place between gears 43 and 44, since carrier 46 is locked to ring gear 44 by the irreversible worm and worm wheel 51, 52, and since the relative movement of said gears 43 and 44 is enforced and controlled by the relative movement of worm wheel 51 with the peripherical teeth 52 upon ring gear 44. The springs 60, 61 and 62, 63 permit the necessary planetary movement of the rollers relative to each other.

It will be seen that the above invention has a number of advantages. In the first place the auxiliary rollers must take an exact position corresponding to the master roller so that there can be no slippage between any of the rollers and the surfaces of the races. Since a high spring pressure is used to force the rollers and races together, all of the surfaces of both races and of the rollers may be hardened steel. The provision of more than one roller eliminates side thrust on the bearings thereby permitting more end pressure to be used. It will be noted that the arrangement is such that with constant pressure of the springs 23, the component of pressure between the rollers and their races is greatest when the inclination is greatest, thus giving maximum pressure for highest speed change.

In addition, the springs 60, 61 and 62, 63 cause the device to have shock absorbing properties and also permit the device to be used as a torque indicator and also as a dynamometer. The slip clutch provides a safety factor which prevents any abrading of the parts on overload.

For using the device as a governor to keep the driven shaft 11 at a constant speed with a variable speed drive shaft 10, the modified form shown in Fig. 4 has certain advantages.

In this form the adjusting frame 49 and its associated mechanism is omitted. The adjustment is provided by mounting an arm 70 directly upon the carrier 38 to shift it about the axis A. This arm is connected by a ball and socket 71 to a rod 72 which extends to a suitable governor of conventional type, such as a ball governor mounted to rotate with the driven shaft 11. The governor is rotated by or relative to the speed of shaft 10 by conventional means which those skilled in the art will readily understand, and the rod 72 is reciprocated relative to the variations in the centrifugal force to which said governor is sensitive during its rotation by or relative to that of drive shaft 10. Said connection of rod 72 to the governor is by conventional means, likewise readily understood herefrom by those skilled in the art. In this form the ring gear 73 is mounted in a different position and is journalled in the body at 74. Gear segments 75 are respectively mounted to rotate with the carriers 37 and 38 in place of the gears 42 and 43 above described.

In this form the operation is substantially the same except that neither carrier is locked with respect to the ring gear 73. The position of the arm 70 determines the inclination of the master roller 14. Movement of arm 70 changes the angularity of master roller 14 as well as correspondingly moves its gear segment 75, whose worm teeth correspondingly rotates ring gear 73, which correspondingly and oppositely moves gear segment 75 fixed to holder 38 of roller 15 until the angularity of roller 15 is substantially equal and opposite to that of master roller 14. Whereupon the initial rotation of rollers 14 and 15 will automatically result in the fine adjustment of the angularity of roller 15 to the equal opposite angularity of master roller 14 by reason of the limited relative motion of carrier 47 and its centering springs 62 and 63, as heretofore explained in connection with the other form of the invention. Since the inclination of the master roller 14 is fixed, no relative movement between it and the ring gear 73 can take place. The one or more follower rollers must shift with respect to the ring gear 73 to change the inclination thereof so that their peripheral speeds must correspond to the speeds of the parts of the races which they engage.

It will be understood that in this form the inclination of the master roller 14 is continuously changing as the governing action takes place, and that the auxiliary rollers must follow due to the action above described.

By the present invention, the use of a plurality of rollers in a speed change device of this kind is made possible. An impediment to the use of a plurality of rollers in the past has been the impossibility of keeping them in exact corresponding positions. If positive mechanical means is provided to do this, any slight wear will cause these means to become ineffective, causing resultant slippage between their rollers and races and ruining the surfaces.

By the present invention the corresponding increase or decrease of planetary force exerted on the carriers caused by mis-positioning, causes a corrective factor to be introduced which causes the rollers to automatically assume proper position.

What is claimed is:

1. In combination, spaced driving and driven disks having opposed grooves, said grooves having circular cross sections defining the same circle, a plurality of rollers operating between said grooves, one of said rollers being a master roller, the rest of said rollers being auxiliary rollers, a plurality of holders, one for each roller, means journalling said rollers in said holders, a plurality of carriers, one for each roller, means for journalling said holders in said carriers about axes perpendicular to and intersecting the axes of said rollers at the center of said circle, means for pivoting said carriers about the aligned axis of said disks, an annular gear surrounding said rollers, gears on said holders meshing said annular gear, a frame connected to the holder for the master roller, a worm wheel secured to said circular gear, a worm journalled in said frame and meshing said worm wheel, means to adjust said worm wheel to adjust said master roller about its holder axis to change the speed ratio between said races, a support adjacent said races and spring means between said carriers and said support.

2. In combination, spaced driving and driven disks having opposed grooves, said grooves having circular cross sections defining the same circle, a plurality of rollers operating between said grooves, one of said rollers being a master roller, the rest of said rollers being auxiliary rollers, a plurality of holders, one for each roller, means for journalling said rollers in said holders, a plurality of carriers, one for each roller, means for journalling said holders in said carriers about axes perpendicular to and intersecting the axes of said rollers at the center of said circle, means for pivoting said carriers about the aligned axis of said disks, a circular adjusting gear, gears on said holders meshing said adjusting gear, a lever secured to the holder of the master roller to adjust the latter about its holder axis to change the speed ratio between said races, a support adjacent said races and spring means between said carriers and said support.

3. In combination, spaced driving and driven disks having opposed grooves, said grooves having circular cross sections defining the same circle, a plurality of rollers operating between said grooves, one of said rollers being a master roller, the rest of said rollers being auxiliary rollers, a plurality of holders, one for each roller, means journalling said rollers in said holders, a plurality of carriers, one for each roller, means for journalling said holders in said carriers about axes perpendicular to and intersecting the axes of said rollers at the center of said circle, means for pivoting said carriers about the aligned axis of said disks, a circular adjusting gear, gears on said holders meshing said adjusting gears, means for adjusting the master roller about its holder axis to change the speed ratio between said disks, a support adjacent said races and spring means between said carriers and said support.

4. In combination, a disk-like driving member, a disk-like driven member parallel thereto, a plurality of rollers between said members with their peripheries engaging said members, a separate carrier for and in which each of said rollers is adjustably supported to impart variable motion from one of said members to the other member, separate means for independently pivotally mounting each of said carriers about a point concentric with the axis of at least one of said members, spring means engaging a fixed element and stressed by pivotal movement of at least one of said separate means, and means for moving said carriers and their separate means substantially uniformly.

5. In combination, a driving member, a driven member, said members being spaced apart and having their juxtaposed surfaces adapted to be engaged by at least one intermediate roller, at least two rollers one of which is a master roller revolubly mounted intermediate and drivingly engaging portions of the juxtaposed surfaces of the driving and driven members, separate means movable concentric with the axis of one of said members and independently supporting each of said rollers, a casing in which at least some of said parts are mounted and enclosed, said casing having a slot extending therethrough; means including the means supporting the master roller, having a portion extending through said slot, for changing the position of said rollers for varying the speed at which the driving member drives the driven member, and indicating means actuated by said last named means for indicating a function of said change of position.

6. The combination of claim 5 further characterized by said indicating means comprising a relatively stationary and a movable element having a circular movement, each exposed outside of the casing and movably supported relative to the casing.

7. In combination, a revoluble driving member, a revoluble driven member juxtaposed to and having its axis of rotation coincident with that of the driving member, a master roller and a follower roller between and on opposite sides of the axis of rotation of said members, separate means each movably mounted at said axis of rotation and independently supporting each of said rollers, each of said separate means being independently movable concentric with the axis of the driving member, means mounted upon each of said separate means for laterally rotatably supporting the respective master and follower rollers, means for moving said separate means and the second stated means each of the master roller by which the position of the master roller may be shifted to contact surfaces of said members at different distances from their centers to control the speed ratio between said members, means for moving said separate means and the third stated means of the follower roller and causing said follower roller to assume a speed change position substantially corresponding to that of said master roller, and equalizing means cooperating with at least an element of the fourth stated means and acting upon and limiting the extent of movement of the separate means independently supporting the follower roller and for attaining a fine adjustment of the follower roller exactly to the same speed change position of the master roller.

8. The combination of claim 7 further characterized by the means supporting the master roller being provided with and supporting manually operable means for adjusting the planetary and axial positions of the rollers.

9. The combination of claim 7 further characterized by the means for supporting the master roller being provided with and supporting means for indicating a positional function of the master roller, and by the means for shifting the position of the master roller also operating said indicating means.

10. The combination of claim 7 characterized by a casing incasing the elements of said claim, said casing having a slot extending therethrough, by the means supporting the master roller being provided with indicating means, and by at least a portion of the means for moving said separate means being extended through said slot and operatively connected with the indicating means.

11. The combination of claim 7 characterized by each element of the first stated means having a limited planetary movement concentric with the axis of at least one of said members, and by the equalizing means being resilient.

12. The combination of claim 7 characterized by the driving and driven members each having opposed circular grooves, by the first stated means having a planetary movement concentric with the axis of both of said members, by master and follower rollers and their respective supporting means being normally in definite different angular positions, and by the equalizing means being resilient and limiting the extent of movement from normal position of the separate means independently supporting the follower roller.

13. The combination of claim 7 characterized by the equalizing means comprising a spring.

14. The combination of claim 7 characterized by the equalizing means comprising a spring upon opposite sides of the separate means independently supporting the follower roller.

15. In combination, separate driving and driven shafts whose longitudinal axes are in alignment, a driving and a driven member each mounted on their respective ones of said shafts and having opposed circular grooves defining opposite portions of the same circle, a master and a follower roller intermediate said grooves, separate means supporting each of said rollers for movement of said means concentric with the axis of said shafts and for moving said rollers laterally in the arc of a circle defined by said grooves, the driving member being driven by the driving shaft, a thrust bearing member mounted upon the driving shaft and frictionally engaging the driving member; one of said frictionally engaging elements being feathered to and longitudinally slidable, and the other of said elements being freely revolvable, upon the driving shaft; common means for holding the peripheries of said rollers in engagement with said grooves and portions of the thrust bearing and driving member in engagement with a definite friction, and means for varying the portions of said grooves engaged by said rollers for varying the rate of speed of the driven shaft relative to the driving shaft.

16. In combination, separate driving and driven shafts whose longitudinal axes are in alignment, a driving and a driven member each mounted upon their respective ones of said shafts and having opposed circular grooves defining opposite portions of the same circle, a master and a follower roller intermediate said grooves, separate means supporting each of said rollers for movement of said means concentric with the axis of said shafts and for moving said rollers laterally in the arc of a circle defined by said grooves, means for varying the portions of said grooves engaged by said rollers for varying the rate of speed of the driven shaft relative to the driving shaft, stressed friction driving means intermediate one of said shafts and its member for imparting movement of one to the other and whose stress holds said grooves in frictional driving engagement with said rollers, means for operatively connecting the other of said shafts to said member mounted thereon, and a frame for supporting the aforesaid parts.

17. The combination of claim 16 characterized by said stressed friction driving means comprising the following elements; the frame having a guide portion, an element slidable therein, spring means moving said slidable element and affording the said stress, and a thrust bearing on one of said shafts and engaging said slidable element and said member mounted on said shaft.

18. A variable speed mechanism comprising in combination, separate driving and driven shafts whose longitudinal axes are in alignment, a driving and a driven member each mounted on their respective ones of said shafts, said members being spaced apart and having in their adjacent faces opposed circular grooves concentric with said axes and defining opposite portions of the same circle, a plurality of separate arms intermediate said members, each pivotally mounted at its inner end coincident with said axes, from which axes said arms extend in different directions, a plurality of rollers intermediate said members with each roller being adjacent the outer end of its respective one of said separate arms and its periphery adapted to contact portions of said grooves on opposite sides of said axes, means mounted upon the outer end of each of said separate arms for laterally rotatably supporting the adjacent one of said rollers, and means cooperating with at least one of the arms and the first stated means for the attainment of speed adjustments.

19. The combination of claim 18 further characterized by means for indicating a positional function of the master roller and which means is mounted upon the independently movable means supporting the master roller.

JOHN A. PINAUD.